Sept. 6, 1960   P. C. HUNGERFORD, JR., ET AL   2,951,568
NORMALLY ENGAGED TYPE SPRING CLUTCHES
Filed Dec. 19, 1958

INVENTOR.
P. C. HUNGERFORD JR.
RUSSELL F. NEFF
BY
ATTORNEY

United States Patent Office 2,951,568
Patented Sept. 6, 1960

2,951,568

NORMALLY ENGAGED TYPE SPRING CLUTCHES

Philip C. Hungerford, Jr., Cleveland Heights, and Russell F. Neff, East Cleveland, Ohio, assignors to Curtiss-Wright Corporation, a corporation of Delaware Filed Dec. 19, 1958, Ser. No. 783,640

4 Claims. (Cl. 192—81)

This invention relates to an intermittent stop control spring clutch of the automatically engaging or normally engaged type. Such a spring clutch of conventional construction comprises coaxial input and output clutch drum members, the former connected to a motor for continuous rotation, the latter connected to a rotary load, and a helical clutch spring connected at one end for rotation with the output drum member and having coils at its opposite or "free" end elastically preloaded on the input drum member for automatic energization to drive the load. Stop control comprises suitable abutment or equivalent means to arrest rotation of the clutch spring at such opposite or input-drum-associated end, and such control means commonly includes a control sleeve mounted to turn on the axis of the clutch drum assembly and being connected to such free end portion of the clutch spring so that when the sleeve is stopped by the abutment means the free end coils can no longer grip the input drum and the clutch is disengaged.

When stopping of the control sleeve occurs the free end coils of the clutch spring of the above outlined type of clutch may be caused, as by the inertia of the load connected to the output-drum-associated end of the clutch spring to move out of contact with the input drum so as not to have overrunning wear-producing drag thereon and so that the free end coils cannot become spasmodically engaged with the input drum so as to produce chatter and so called "vibration corrosion." When, however, the load has very little inertia and/or low friction then the free end coils, through energy stored therein during the clutch disengaging operation, usually return by recoil action into contact with the input drum with the above indicated undesirable results. Such recoil action can be prevented by anti-reverse mechanism connected to the output drum or to the load but then the clutch design or installation becomes complicated hence expensive.

The present invention provides a normally engaged or automatically engaging type of intermittent stop control spring clutch wherein the input-drum-associated coils of the clutch spring are so made as to tend to move out of engagement with the input drum during disengagement of the clutch, and cooperating overrunning friction control coil means are so arranged as to impart energizing torque furnished by the continuously rotating power means reliably to the input-drum-associated coils of the clutch spring to effect clutch engaging operations and without producing undesirable shock to the clutch or strain in its clutch spring. The overrunning control coil means takes the place of the usual free end portion of the clutch spring in causing automatic engagement of the clutch.

Since a helical friction spring operating in the overrunning direction relative to its associated drum or drums has a torque transmitting capacity which is independent of change in coefficient of friction, the energizing torque imparted to the main or conventionally acting driving spring can be easily predetermined so that by design selection of a proper number of coils of the main driving spring the torque capacity of the clutch can be made to have a predetermined value within desirable limits. The present clutch has such torque limiting feature in common with the subject matter of a copending application of D. R. Tomko and R. F. Neff, Serial No. 777,140 filed November 28, 1958, owned by the assignee of the present application wherein the principle of operation is fully explained. In the drawing—

Figure 1:
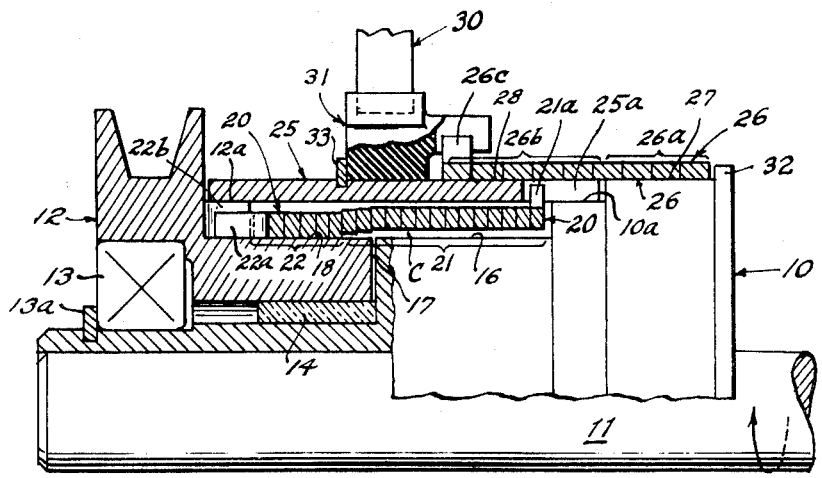
Fig. 1 is a fragmentary enlarged sectional view of the present spring clutch (only one half of the entire clutch being shown) in disengaged condition.

In Fig. 1 an input clutch drum member 10 is shown in the form of a shaft adapter suitably secured to a drive shaft 11 which may be assumed to be rotated continuously as a function of energizing a driving electric motor, not shown. An output clutch drum member 12 coaxial with the input drum member 10 and shown in the form of a pulley is journalled for support by the drive shaft as on suitable bearings 13 and 14 so that the two clutch drum members can turn freely independently of each other. The clutch drum assembly can be held together by a snap ring 13a.

The drum members 10 and 12, as shown, have drum surfaces 16 and 18 of approximately equal diameters at opposite sides of the crossover region (gap 17). The driving helical clutch spring 20 has a group of coils 22 in preloaded "anchoring" relationship to output drum surface 18 (shown as supplemented by a toe and slot connection 22a, 22b with the output drum) and a group of coils 21 bridging the crossover gap 17 and which coils 21 are so manufactured, i.e. oversize, as normally to be free from both drum surfaces 16 and 18 in a relaxed condition of the clutch spring 20, establishing normal clearance C.

A control sleeve 25 is mounted for free angular movement on the above described clutch drum assembly, as on circular supporting surfaces 10a and 12a of the drum members 10 and 12; and a terminal one of the free coils 21 of the driving clutch spring 20 is shown as attached to the control sleeve to turn with the sleeve. The attachment as shown in Fig. 1 comprises a toe 21a of the clutch spring 20 occupying an axial slot 25a in the control sleeve. The clutch spring 20, for the direction of operation of the arrow on the drive shaft 11 is left hand coiled or wound.

The overrunning control helical spring means includes, as shown in Fig. 1, a right-hand-coiled spring member 26 in free floating elastically preloaded relationship to cooperating external drum surfaces of the shaft adapter or input drum member 10 and of the control sleeve 25. Coils 26a of spring member 26 are more heavily preloaded on drum surface 27 of member 10 than are coils 26b on the drum surface 28 of sleeve 25 for reasons which will be explained later in describing the operation of the present clutch. The "flat wound" form of helical control member 26 is preferred in order that unit pressure between coils 26a and the drum surface 27 may be relatively low, minimizing wear during disengagement periods of the clutch.

The calculated minimum preloading of the control spring 26 on the control sleeve 25 is such that the overrunning friction of the control spring on the control sleeve during engagement operations will be sufficient to turn the control sleeve on its supporting surface 12a (via torque imparted by the input drum member 10) such as to overcome the spring moment of coils 21 of the driving clutch spring 20 and impart sufficient energizing torque thereto to cause those coils to contract and grip their associated input and output drum surfaces 16 and 18 and drive the load.

Figure 2:
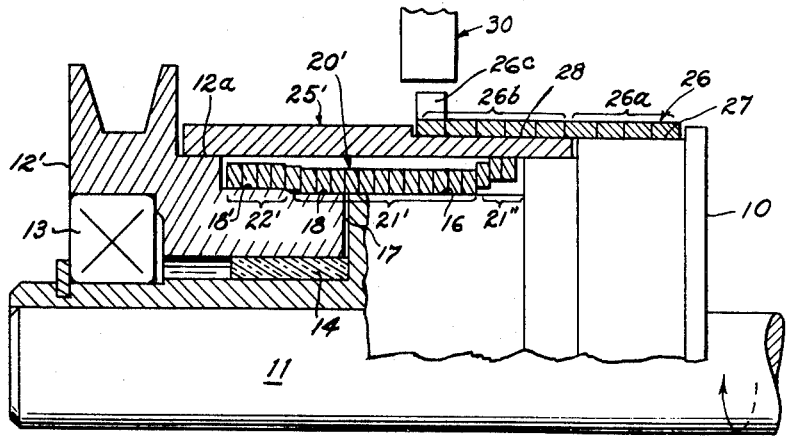
Fig. 2 is a similar view showing a somewhat modified form of clutch in engaged condition.

Actuator 30 (lever, plunger or the like) in its Fig. 1 illustrated position stops rotation of a ring 31 freely journalled on the control sleeve 25 and abutting or connected with the control spring 26, as at a toe portion 26c thereof. The control coil 26 and the ring 31 are held loosely in axial position by a shoulder 32 on the input drum member 10 and a cooperating shoulder in the form of a snap ring 33 in an external groove of the control sleeve 25. The ring 31 thereby prevents movement of the control coil 26 out of position toward the left. In Fig. 2 the actuator 30 makes direct contact with the toe portion 26c of the control spring 26.

The construction according to Fig. 2 is operatingly the same as that of Fig. 1 and similar identifying characters are used (primed if physically different). In Fig. 2, as shown, coils 22' of the driving spring 20' are anchored to the output member 12' solely by heavy preloading of coils 22' as on a stepped drum surface 18' and (in lieu of the toe and slot connection 21, 25a between the control sleeve and the free end coils of driving spring 20, as in Fig. 1) an end coil portion 21" of spring coils 21' (Fig. 2) is coiled oversize so as to be heavily preloaded on the internal surface of the control sleeve 25'.

Operation

The operation of the present clutch is identical in the two herewith illustrated forms. When the toe 26c of the control spring (or ring 31) is released by the actuator 30 (see Fig. 2) the clutch becomes engaged. The overrunning torque between control coils 26a of control spring 26 and the continuously turning input drum member surface 27 drives the control spring 26, and the coils 26b thereof in overrunning contact with the control sleeve 25 turn the sleeve relative to the output drum member 12 through the required limited angular distance to cause contraction of main or driving spring coils 21 or 21' onto their associated drum surfaces 16 and 18.

During acceleration of the load up to the speed of the input drum member 10 the driving spring coils 21 or 21' are designed to slip on the input drum surface 16 as a function of the energizing torque applied by the constantly acting overrunning control spring 26 to the main spring coils 21 or 21' which as noted earlier herein are of appropriate number and design for the purpose as more fully explained in the above identified Tomko and Neff application. During engagement of the clutch, after the driving spring 20 or 20' is contracted, there is no relative rotation between any of the described parts; hence, static friction then obtains between the control spring coils 26b and the control sleeve 25 (or 25'), insuring maintenance of the driving spring coils 21 or 21' in contracted condition despite cyclic or other minor variations in the reaction torque of the load.

Immediately upon arrest of rotation of the control spring 26 by movement of the actuator 30 as into the position of it shown in Fig. 1, the coils 26b of the control spring are expanded due to overrunning drag between the arrested control spring coils 26a and the input drum member 10, allowing the moment or recoil force of the contracted main spring coils 21 (or 21') to return those coils to their normal or expanded condition or as shown in Fig. 1; and overrun between the input drum member 10 and coils 26a of the control spring 26, then continues to take place so long as the clutch remains disengaged and rotation of the input drum member continues.

It will be apparent that since, after disengagement of the clutch, there is no torsional strain in the expanded coils 21 (or 21') of the driving spring 20 (or 20') in a direction to contract them, there is no tendency for the coils 21 (or 21') to reseat themselves on the associated drum surfaces such as occurs in a conventional self energizing clutch spring in an intermittent stop control spring clutch of the normally engaged type. Expansion of coils 21 (or 21') of the main clutch spring clear of the drum surfaces 16 and 18 is moreover wholly independent of overrun of the load due to its inertia. In case the load has considerable inertia and/or freedom from friction, the overrunning relationship of the control sleeve 25 (or 25') relative to the control spring coils 26b enables the load to coast to a stop without possibility of injuring the main driving clutch spring or other parts.

The present clutch and its actuator mechanism suffer very little shock during clutch disengagement since the control drum or sleeve 25 or 25' is not suddenly arrested and can turn freely, decelerating with the coasting load. The control spring has very little mass, and since it is free to yield elastically as it is stopped by the actuator 30, there is no danger of damaging either the toe 26c of the control spring 26 or the actuator.

For operation of the present clutch at very high speeds it is necessary to increase the designed stiffness of the control spring 26 and/or its preloading on the surface 28 of the control sleeve over what is necessary for low speed operation since the control spring is subjected to centrifugal force tending to expand it. Such expansion is desirable in some installations for torque limiting as a function of speed. The loading relationship of control coil and control sleeve may thus be so chosen that the overrunning friction between control coils 26b will fail to hold the main clutch spring coils 21 (or 21') in gripping contact with the drum surfaces 16 and 18 at any desired value in terms of speed.

We claim:

1. In a normally engaged type spring clutch, a normally turning input clutch drum member, an output member coaxial therewith for connection to a load, a driving helical clutch spring secured to turn with the output member and having coils normally free from input drum member but arranged to grip it, a control drum member supported to turn with the output member about its axis but being capable of angular movement relative thereto, a full floating control helical coil spring member preloaded on mutually adjacent drum surfaces of the control drum member and the input drum member and coiled oppositely of the driving clutch spring so as to overrun continuously on the input drum member when the clutch is disengaged, said control drum member being connected to the normally free coils of the clutch spring so as to deflect those coils into gripping contact with the input drum member as a function of frictional drag of the control coil member on the control drum member whenever the control spring member is allowed to rotate with the input drum member, and actuator means operable to stop and to permit rotation of the control spring member with the input drum member at different times whereby to initiate disengagement and engagement of the clutch.

2. The clutch according to claim 1, wherein the control drum member is a sleeve surrounding the clutch spring and wherein the control coil spring member is preloaded for overrunning friction contact with an external drum surface of the control sleeve and is more heavily preloaded on an external drum surface of the input drum member.

3. The clutch according to claim 2, including a ring turnably mounted on the sleeve and having an abutment connection with the control coil spring member, and wherein the actuator means makes rotation-restraining contact with the ring to disengage the clutch.

4. In a spring clutch adapted to transmit torque in one direction, relatively angularly movable, axially adjacent input and output clutch drum members, a driving helical clutch spring bridging the drum members and having coils at one end preloaded on the output drum member and coils at the other end formed to be free from the input drum member but peripherally close thereto in a relaxed condition of the spring, a control drum member connected to the free end coils and freely journalled for angular movement relative to both clutch drum members about their common axis, a control helical spring coiled oppositely of the coiling of the driving clutch spring and in free floating elastically preloaded relationship to the control drum member and an adjacent drum surface of the input drum member whereby to impart torque from the input drum member to the control drum member and to cause relative angular movement of the control drum member and output clutch drum member and deflection of said normally free coils into gripping engagement with the clutch drum members whenever the control spring member is free to rotate with the input drum member, and actuator means operable to free the control spring member for rotation and to block its rotation.

References Cited in the file of this patent

UNITED STATES PATENTS 2,551,739  Harlan ---------------- May 8, 1951

FOREIGN PATENTS 540,660  Canada ---------------- May 7, 1957